United States Patent [19]

Gupta

[11] Patent Number: 5,751,082
[45] Date of Patent: May 12, 1998

[54] HIGH STARTING TORQUE INDUCTION MOTOR

[75] Inventor: Umesh C. Gupta, Clinton, Miss.

[73] Assignee: Vickers, Incorporated, Maumee, Ohio

[21] Appl. No.: 525,084

[22] Filed: Sep. 8, 1995

[51] Int. Cl.$^6$ ............................ H02K 17/18; H02K 17/16
[52] U.S. Cl. ...................... 310/72; 310/68 B; 310/68 E; 310/211
[58] Field of Search ........................... 310/72, 68 E, 310/68 B, 211

[56] References Cited

U.S. PATENT DOCUMENTS

| | | | |
|---|---|---|---|
| 3,904,731 | 9/1975 | Orkin et al. | 264/242 |
| 4,377,731 | 3/1983 | Georgelin | 200/80 R |
| 5,068,560 | 11/1991 | Lundquist | 310/125 |

Primary Examiner—Steven L. Stephan
Assistant Examiner—Tran N. Nguyen
Attorney, Agent, or Firm—Barnes, Kisselle, Raisch, Choate, Whittemore & Hulbert, P.C.

[57] ABSTRACT

A high starting torque induction motor with simultaneously reduced starting current adapted to be associated with a drive having a high load torque on starting that includes a stator, a rotor, a first end ring fixed on said rotor, a second movable end ring associated with said rotor and having a lower electrical resistance than the first ring, and a centrifugal device associated with the second ring and operable upon the rotation of the rotor at a predetermined speed such that, when the motor is electrically energized, the high resistance of the first ring produces a high starting torque at reduced starting current, and when the motor achieves a predetermined speed, the second ring is moved into engagement with the first ring reducing the effective resistance and permitting normal operation of the electric motor.

4 Claims, 2 Drawing Sheets

5,751,082

HIGH STARTING TORQUE INDUCTION MOTOR

This invention relates to electric motors that are intended for use in association with drives that require large starting torques.

BACKGROUND AND SUMMARY OF THE INVENTION

There are several applications that involve high load torque imposed upon the associated drives at start. An electric motor driving a pressure compensated variable displacement piston pump is one such example. A typical aerospace a.c. induction motor often represents a very demanding performance at −65° F. during a start essentially due to additional torque load, a limited allowable current and the required short time to reach the full speed. Consequently, the motor is designed so that its performance at normal full-load running conditions is a compromise. In some instances expensive hydraulic controls are employed to delay the imposition of the load torque until after the motor crosses the "pull-up torque" point.

It is not uncommon to introduce additional rotor resistance through slip rings during start in many industrial applications that utilize wound rotors and stators. The slip rings are short circuited, thus eliminating the additional resistance, at a suitable speed by means of a centrifugal device to resume normal operation. The method is very effective because higher starting torque, lower starting current and a higher power factor are simultaneously achieved. Theoretically, if the total rotor resistance can be made high enough to be equal to the rotor reactance at start, the "peak-torque" point of the torque-speed curve can be realized at start. Unfortunately, the reliability (the MTBF requirements) for aerospace products in general makes it quite undesirable to have wound rotor and sliding contacts, not to mention the contamination associated with the brush dust.

Among the objectives of the present invention are to provide a reliable electric motor which will have a high starting torque at reduced starting current, and good normal load running efficiency; which will meet desired aerospace safety requirements; which is simple and requires a minimum number of parts; and which cannot be readily contaminated.

In accordance with the invention, a high starting torque induction motor, with simultaneously reduced starting current, adapted to be associated with a drive having a high load torque on starting, comprises a stator, a rotor, a first end ring fixed on said rotor, a second movable end ring associated with said rotor and having lower electrical resistance than the first ring, and a centrifugal device associated with the second ring and operable upon the rotation of the rotor at a predetermined speed. When the motor is electrically energized, the high resistance of the first ring produces a high starting torque at reduced starting current, and when the motor achieves a predetermined speed, the second ring is moved into engagement with and is clamped against the first ring, reducing the effective rotor resistance and permitting normal operation of the electrical motor.

DESCRIPTION

Figure 1:
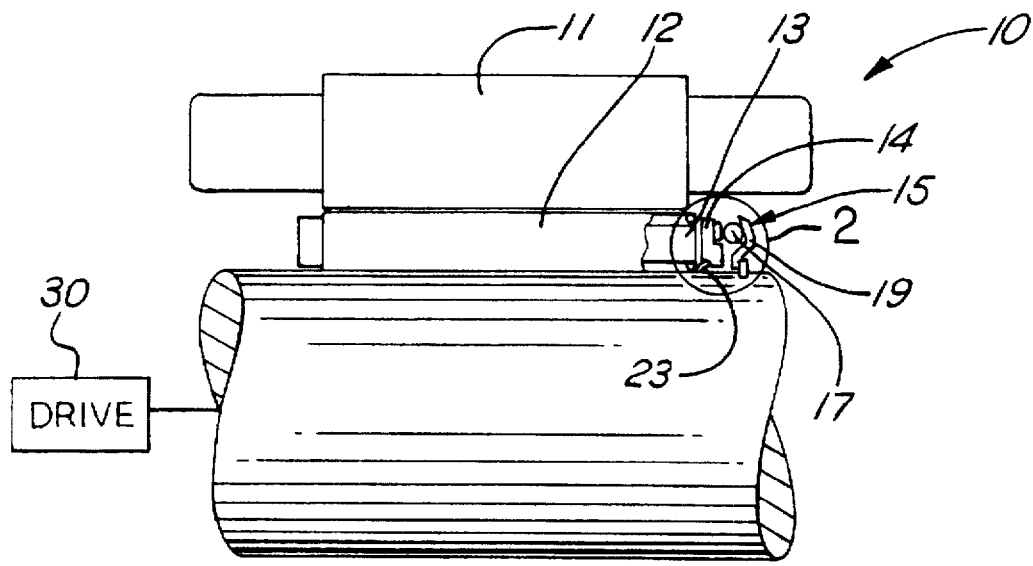
FIG. 1 is a fragmentary view of an electric motor embodying the invention.
Figure 2:
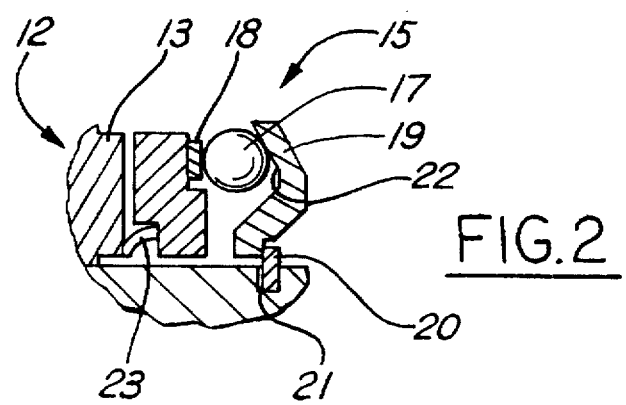
FIG. 2 is a view on an enlarged scale of a portion of the motor within the circle 2 in FIG. 1.

Referring to FIG. 1 and FIG. 2, in accordance with the invention, a high starting torque induction motor 10 is adapted to be associated with a drive 30 having a high load torque on starting. Motor 10 comprises a stator 13 and a rotor 12. A first end ring 11 is fixed on the rotor 12, and a second movable end ring 14 is associated with the rotor 12. Movable end ring 14 has a lower electrical resistance than the first end ring 13, and may be of copper construction, for example. A centrifugal device 15 is associated with the second ring 14 and is operable upon the rotation of the rotor 12 at a predetermined speed. When the motor 10 is electrically energized, the high resistance of the first ring 13 produces a high starting torque at low starting current. However, when the motor 10 achieves a predetermined speed, the second ring 14 is moved into engagement with the first ring 13 and is clamped against the first ring 13, reducing the effective rotor resistance and permitting normal operation of the electric motor.

The motor 10 is designed for the required performance at full load. The stator 11 is of conventional construction. Referring to FIG. 1, the rotor 12 is manufactured with the thin end-ring 13 on one side only, such that the total rotor resistance is adequately high for the desired starting torque and current. The surface of the thin end-ring 13 is machined to achieve the required finish and flatness for electrical contact with the second ring 14. The separate copper ring 14 is similarly machined (and silver plated if necessary) so that it may be clamped firmly against the machined surface of the thin end-ring 13 at a finite speed.

Referring to FIG. 2, the centrifugal device 15 preferably comprises an annular array of a plurality of closely spaced balls 17, which are interposed between a hardened annular steel washer 18 fixed on the movable second ring 14 and a hardened annular steel back up ring 19 which is held against axial outward movement by a retaining ring 20 positioned in a slot 21 in rotor 12. Ring 19 includes an inclined surface 22 that engages balls 17 and extends axially inwardly toward the balls 17.

At start, the clamping force is zero and a gap exists between the two rings 13, 14 maintained by a suitable arrangement such as a wave washer 23. Due to the high resistance of ring 13, ring 14 being electrically disconnected from ring 13 by centrifugal device 15, rotor 12 exhibits high total resistance and produces the desired high starting torque at reduced starting current. As the rotor 12 picks up the speed and reaches the predetermined speed, a finite centrifugal force is produced on the steel balls 17 that are captured and contained by hardened steel back-up ring 19. The steel balls 17 are allowed to move radially outward along the suitably steep inclined surface 22 of the back-up ring 19. The axial component of this centrifugal force overcomes the preload of wave-washer 23 and produces a sufficient net clamping force on the copper ring 14 (through protective washer 18) to move the ring 14 into mechanical and electrical abutting engagement with the ring 13, and thereby creates a good electrical contact between the copper ring 14 and the end-ring 13 without arcing. The combined equivalent resistance of the two rings is lowered significantly and, therefore, the total rotor resistance is lowered to a desired level to achieve the normal speed and performance. Higher efficiency and higher power factor are inherently attained. The hardened steel washer 18 between the balls 17 and the copper ring 14 protects the copper ring 14 from progressive yielding and deformation due to the concentrated forces produced by the balls 17. The balls 17 are arranged such that they essentially fill the entire peripheral space available to produce large clamping force and to minimize rotational slippage between the balls 17 and the back-up ring 19. The retaining ring 20 retains all the components involved.

In a typical example, for a 2.50 inch OD rotor, 27 steel balls of 0.125 inch radius each may be located at 2.25 inch diameter circle supported by the inclined surface 22 at an angel of 60° with the shaft axis to produce a net clamping force of 197 lbs at 8000 rpm. An eight brake-horsepower three-phase induction motor of such a construction may have a 4.2 inch diameter stator, a two inch long rotor, and operate at 400 Hz.

Figure 3:
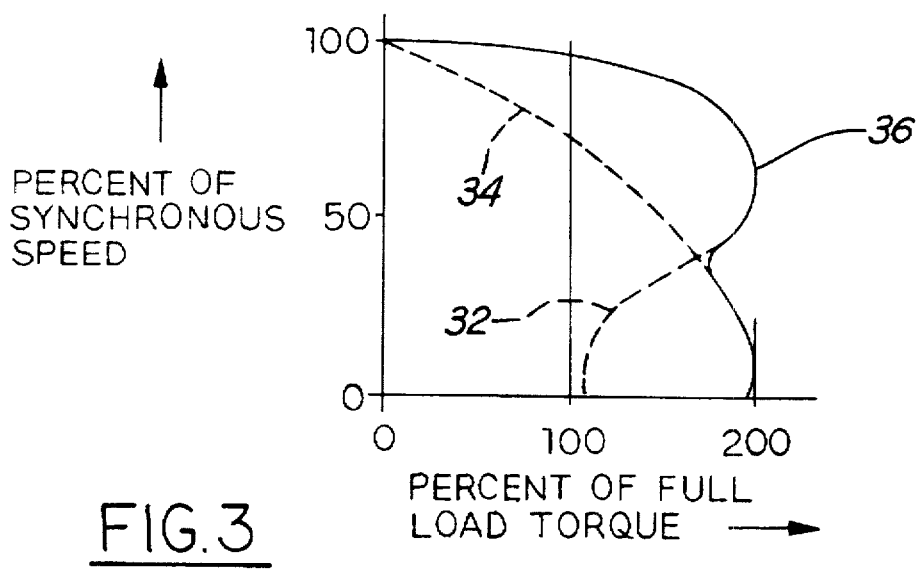
FIG. 3 is a curve of percent of synchronous speed versus percent of full load torque.

Referring to FIG. 3, the solid curve 36 represents the torque-speed characteristics of the motor 10 embodying the present invention. The dotted line excursions 32 and 34 represent continuations of normal torque-speed characteristics of a low resistance rotor and a high resistance rotor, respectively, without any switching. The intersection of the two individual curves 32, 34 represents a suitable switching point from the high resistance curve to the low resistance curve to maximize available motor torque for acceleration.

In accordance with the invention, an existing design of a motor can be modified by modifying just the rotor and machining it appropriately to be reassembled with the other necessary components.

It can thus be seen that there has been provided an electric motor which will have a high starting torque at reduced starting current and good normal load running efficiency; which performs arc-free electrical switching; which will meet desired aerospace safety requirements; which is simple and requires a minimum number of parts; and which cannot be readily contaminated.

Figure 4:
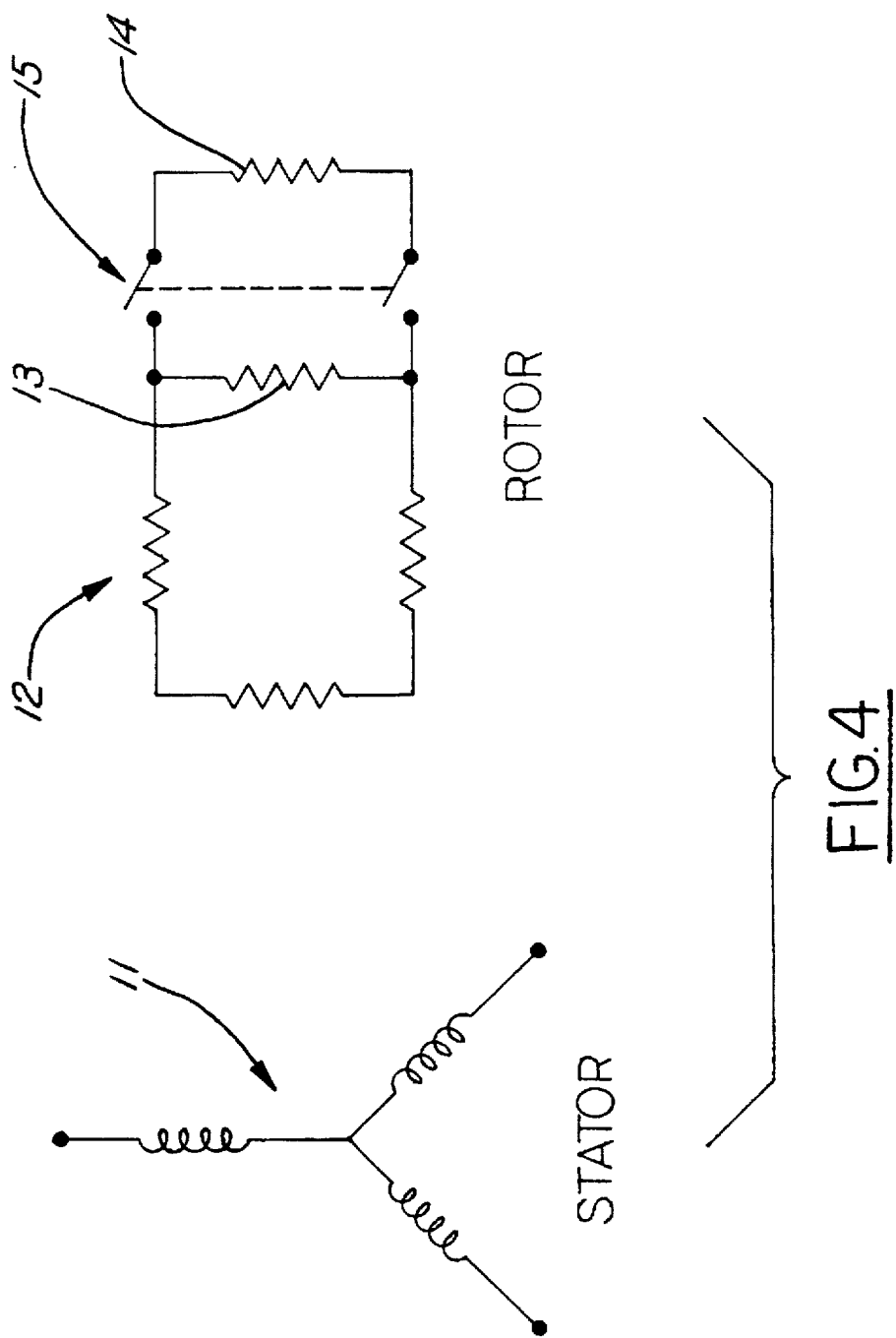
FIG. 4 is an electrical schematic diagram of the motor of FIGS. 1–3.

FIG. 4 depicts the electrical schematic diagram of the rotor 12 comprising fixed end ring 13 and a movable second ring 14 and a centrifugal switching device 15 represented by their respective functionally associative electrical components.

I claim:

1. A high starting torque electric motor adapted to be associated with a drive having a high torque load on starting comprising:

a stator, a rotor disposed for rotation about an axis within said stator and having a first end ring affixed to said rotor with a flat end face facing axially outwardly from said rotor, a second end ring carried by said rotor axially adjacent to said first end ring and having a flat end face axially opposed to said flat end face on said first end ring, said first end ring having a higher electrical resistance than said second end ring, means axially resiliently spacing said second end ring from said first end ring such that said flat end ring faces are axially spaced from each other, and a centrifugal device associated with said second ring and operable upon rotation of the rotor at a predetermined speed such that, when the motor is electrically energized, the higher resistance of said first ring produces a high starting torque and reduces starting current, and when the motor achieves said predetermined speed said second ring is moved into engagement with the first ring at said flat end faces and reduces the effective rotor resistance and permits normal operation of the electric motor, said centrifugal device comprising a third ring axially affixed to said rotor on a side of said second end ring opposed to said first end ring, one of said second and third rings having a circumferentially continuous surface inclined toward the other of said second and third rings, and an annular array of balls disposed between said second and third rings, and captured between said rings by said inclined surface, said balls being urged radially outwardly along said inclined surface by centrifugal force of rotation of said rotor to urge said second ring into facing abutment with said first ring.

2. The motor set forth in claim 1 further including a hardened ring interposed between said balls and said second ring to minimize any tendency of deformation of the second ring by the balls.

3. The motor as set forth in claim 1 wherein said first ring, having said higher electrical resistance than said second ring, defines in association with said stator and rotor a first speed/torque characteristic for said rotor; wherein said second ring, having a lower electrical resistance than said first ring, defines a second speed/torque characteristic for said motor; and wherein said centrifugal switching device is such that said predetermined speed is at a point of intersection between said first and second characteristics so as to maximize available motor torque versus speed.

4. The motor as set forth in claim 1 further comprising a retaining ring positioned on said rotor outwardly of said third ring for maintaining said first ring, said second ring, said third ring, said ball array and said resiliently spacing means in assembled relation on said rotor.

* * * * *

UNITED STATES PATENT AND TRADEMARK OFFICE
CERTIFICATE OF CORRECTION

PATENT NO. : 5,751,082
DATED : May 12, 1998
INVENTOR(S) : Umesh C. Gupta

It is certified that error appears in the above-identified patent and that said Letters Patent is hereby corrected as shown below:

Title page, item [56], after Foreign Patent Documents, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 1 | 5 | 7 | 2 | 9 | 1 | 7 | 02/26 | Garcelon | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | | | 3 | 2 | 2 | 0 | 9 | 10/04 | Switzerland | | | | |
| | | | | 9 | 4 | 3 | 7 | 9 | 9/23 | Austria | | | | |
| | | | 1 | 5 | 8 | 9 | 1 | 0 | 11/03 | Germany | | | | |
| | | 6 | 4 | 8 | 2 | 6 | 8 | 7/37 | Germany | | | | | |

Signed and Sealed this

Ninth Day of February, 1999

Attest:

Attesting Officer

*Acting Commissioner of Patents and Trademarks*